March 27, 1956 S. G. WIECHERS 2,739,938
THREE-CHAMBER ELECTRODIALYSIS APPARATUS
Filed Aug. 14, 1951 2 Sheets-Sheet 1
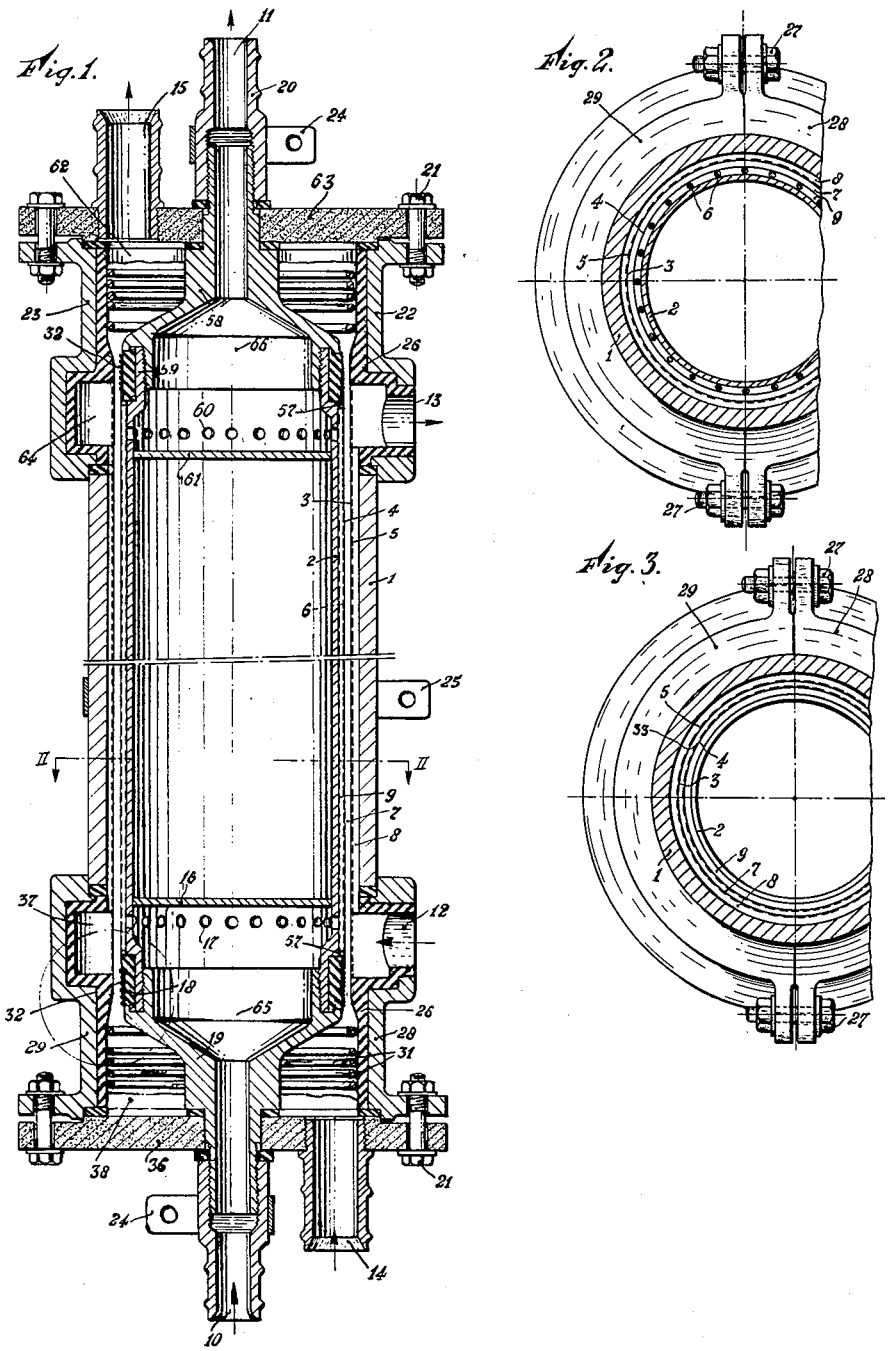
INVENTOR
SYBRANDUS GERHARDUS WIECHERS
BY Pollard and Johnston
ATTORNEYS

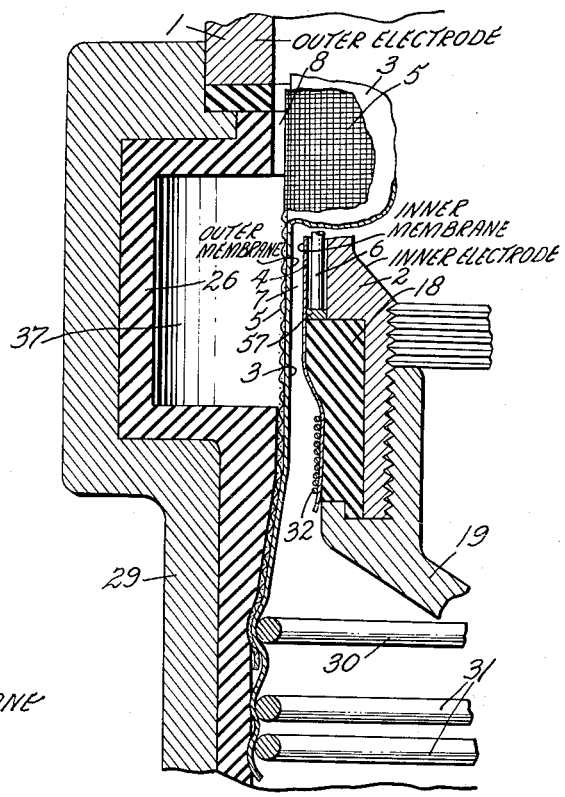
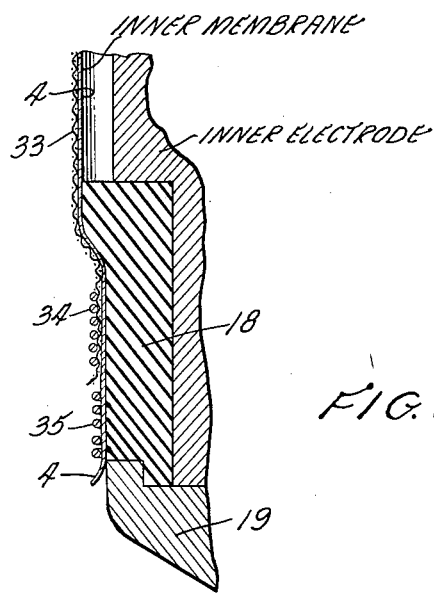

United States Patent Office 2,739,938
Patented Mar. 27, 1956

2,739,938

THREE-CHAMBER ELECTRODIALYSIS APPARATUS

Sybrandus Gerhardus Wiechers, The Hague, Netherlands, assignor to Nederlandse Centrale Organisatie Voor Toegepast - Natuurwetenschappelijk Onderzoek, The Hague, Netherlands, a corporation of the Netherlands Application August 14, 1951, Serial No. 241,794

13 Claims. (Cl. 204—301)

This invention relates to a three-chamber electrodialysis apparatus for the continuous desalting of liquids, of the type having anode, dialysate and cathode chambers separated from each other by flexible membranes.

In an apparatus of this general type, the liquid to be treated is led through a dialysate chamber bordered on two sides by membranes which separate the dialysate chamber from anode and cathode chambers at outer sides of the respective membranes. Each electrode chamber is bordered on one side by a membrane and on the other side, partly or completely, by an electrode. Rinsing liquids are led continuously through the two electrode chambers, and the electrodes are connected to a suitable source of continuous current so that the apparatus is traversed by a current passing successively through the anode, dialysate and cathode chambers. Dissociated compounds present in the dialysate are removed from it by reason of the voltage drop across the dialysate chamber. The cations pass through one membrane into the cathode chamber, the anions pass through the other membrane into the anode chamber, and the ions migrating into each chamber relinquish their electrical charges to the respective electrode.

The use of electrodialysis apparatus of the type mentioned for the desalting of liquids on a large scale has been attended heretofore by serious practical difficulties. These difficulties arise from the complex nature of the electrodialysis process and from conflicting requirements encountered in its practical use.

The electric power consumption is increased as the distance between the electrodes is increased; yet high current densities must be used for large scale desalting operations. Unless the liquid to be treated is forced through the dialysate chamber at a very high velocity, objectionable pH variations and temperature rises occur in this liquid. Unless anolyte and catholyte solutions in the respective electrode chambers are evenly replenished by the continuous circulation of suitable rinsing liquids through these chamber, local concentrations of substances formed from migrating anions and cations at the respective electrodes will build up in the electrode chambers and cause irregularities in the phenomena occurring therein. These formed substances are often harmful to parts of the apparatus, particularly in respect to the anode chamber where acids or chlorine, or both, usually are generated. When such harmful substances are formed the membranes are especially susceptible to local deterioration and to irregularities in their electrodialyzing action. This latter difficulty is especially evident in apparatus making use of thin flexible membranes, for even though rinsing liquids are circulated continuously through the electrode chambers, differences between the pressure heads of the several liquids circulating through the apparatus will cause the flexible membranes to bulge objectionably and in some cases even to touch the adjacent electrodes. When such bulging occurs, it prevents the maintenance of desired uniform conditions in the electrode chambers and allows damaging local concentrations of harmful substances to build up in any electrode chamber where such substances are formed.

Problems encountered in the use of thin flexible membranes cannot be avoided satisfactorily by providing rigid membrane supports in the electrode chambers, for such supports obstruct the free flow of rinsing liquids, so as to permit the building up of corrosive attacks or other irregularities, or else they require that the distance between electrodes be increased objectionably. These problems cannot be avoided by the use of rigid porous membranes, for example, membranes of ceramic material, because such membranes do not permit a very close spacing of the electrodes and their use increases greatly the electrical resistance and the voltage requirements of the apparatus, with consequent increases of power consumption and wastes of energy.

Accordingly, it is important to use thin flexible membranes in any apparatus of the type mentioned and at the same time to have an apparatus of this type that will operate continuously with low power consumption and with freedom from damaging local concentrations of harmful substances in the electrode chambers. The principal object of this invention is to provide a three-chamber electrodialyzing apparatus capable of meeting these requirements and thus reducing or eliminating the practical difficulties referred to above.

According to this invention, a three-chamber electrodialysis apparatus suitable for the purposes above set forth is provided by arranging two cylindrical membranes of thin flexible sheet material in concentric relation, one within the other, to form an annular dialysate chamber between them, providing a cylindrical electrode outside and in concentric spaced relation to the outer membrane so as to form an outer electrode chamber between these elements, providing a second cylindrical electrode inside and in concentric spaced relation to the inner membrane so as to form an inner electrode chamber between these inner elements, supporting the opposite ends of the several cylindrical elements in the desired concentric spaced relationships by means of suitable head assemblies, and providing each of the annular chambers defined between the spaced cylindrical elements with liquid inflow means and liquid outflow means communicating with opposite end portions of such chamber so that a continuous flow of liquid through each annular chamber can be maintained at a composition which is substantially uniform throughout each cross-section of the chamber.

In an apparatus provided according to this invention, at least the outermost of the three concentric chambers forms a substantially unobstructed annular space for the free flow of the corresponding liquid. This is rendered practicable by virtue of the arrangement here described, and by causing the pressure head of the liquid on the inner side of the membrane bordering the outermost chamber to exceed the pressure head of liquid acting on its outer side, thereby subjecting this membrane to inflating pressures and tensile stresses. By reason of its cylindrical form and the mounting of its ends, however, this membrane retains its circular cross-section, and any elongation caused by the tensile stresses is evenly distributed over its circumference so that the spacing between the membrane and the adjacent electrode, or the spacing between it and the other membrane, can be kept practically constant.

When the cylindrical membrane has sufficient mechanical strength to resist the tensile stresses, it can be held in place satisfactorily merely by means of the head assemblies at the opposite ends of the apparatus. If, however, the membrane is not strong enough mechanically to withstand the outward liquid pressure without being unduly stressed or deformed, the membrane nevertheless can be reinforced satisfactorily according to this invention by applying circumferential flexible reinforcing means such as flexible threads or bands extending circularly or spirally around the cylindrical membrane. The reinforcing means may consist of a tubular fabric, or of a thread or tape wound spirally around the membrane. Such flexible means applied circumferentially around the membrane may be very thin and still give such an effective resistance to the stresses exerted on the membrane that the deformation of the membrane in radial direction will remain negligible.

When the pressure in the middle or dialysate chamber is higher than the pressure in the outer electrode chamber, then, obviously, there is no tendency of the membrane separating said chambers to collapse or to inflect towards the axis of the apparatus. Therefore no supporting members need be provided in the dialysate chamber for said membrane. This chamber will therefore have an annular cross-section uninterrupted and unobstructed by any membrane supporting means, which is of course of great advantage.

Accordingly, it is possible in the apparatus of this invention to make the distance between the membrane and the adjacent electrode, or between the two membranes, extremely small, which is of great importance to the efficiency of operation of the apparatus. The distances between the cylindrical elements of the apparatus are readily reduced to 10 mm. or less, and in well designed apparatus they even may be less than 5 mm.; indeed, it has been found that a spacing of as little as 1.5 mm. can be maintained without difficulties.

It is obvious that if the differential pressure head acting on a cylindrical membrane is directed inwardly, i. e. toward the axis of the apparatus, the membrane will tend to collapse or at least to be strongly deflected in inward direction. This will be the case with the inner membrane when the pressure in the dialysate chamber is higher than that in the inner electrode chamber. This difficulty can be avoided by providing supporting rods along the inner surface of the inner membrane, to bear against the surface of the inner electrode.

If the conditions of use of the apparatus are such that objectionably corrosive or harmful substances are formed in the inner electrode chamber, the presence of such supporting rods therein would result in the development of objectionable local concentrations of the harmful substances, with consequent attack upon the membrane. In that event, the use of supporting rods in the inner electrode chamber is dispensed with, and the apparatus is so formed and operated that the liquid pressure head in the inner electrode chamber is kept greater than that in the dialysate chamber, while the liquid pressure head in the latter in turn is kept greater than that in the outer electrode chamber. Accordingly, in embodiments of the invention adapted for such conditions of use, each of the two cylindrical membranes is left susceptible to inflation by an outwardly directed pressure differential, and depending upon their mechanical strength, either membrane may remain unreinforced so as to assume its own position under stress, or may be provided around its outer surface with flexible reinforcing means of the character described above.

The problem arising from the formation of harmful substances generally occurs in the anode chamber, which therefore is generally made to be the outer electrode chamber. For uses in which this problem is not encountered in the cathode chamber, the inner electrode chamber serving as the cathode chamber may contain supporting rods for the inner membrane. In the apparatus adapted for other uses, the three chambers generally will be kept free of objectionable obstructions or interruptions to the desired annular cross-section of the rinsing liquid spaces, and the membranes will be either left unreinforced or provided with flexible reinforcing means as described above, depending upon their mechanical strength.

The chamber arrangement last mentioned is maintained by operating the apparatus in such a way that both the membranes are subjected to tensile stresses. This is the case when the pressure in the middle chamber is higher than in the outer one and the pressure in the inner chamber is higher than in the middle one. This pressure relationship can be easily achieved by control of the flow of the several liquids, if it is not inherent to the apparatus itself.

The thin flexible reinforcing means provided around the membranes advantageously may be composed of a suitable elastomer that provides high mechanical strength with high electrical and mechanical resistance. For example, a fabric or threads of polyvinylidene chloride or of the copolymer of vinylidene chloride and vinyl chloride, commercially known, respectively, as Saran and Saran B, can be used to advantage.

Other objects, features and advantages of this invention will be apparent from the following detailed description of illustrative embodiments, considered in connection with the accompanying drawing in which:

Fig. 1 is a longitudinal section of the electrodialysis apparatus provided with an outer membrane reinforced by a supple armature and with an inner membrane supported by rods.

Fig. 2 represents a cross-section along the line II—II of Fig. 1.

Fig. 3 is a cross-section of an electrodialysis apparatus according to the invention, showing another embodiment wherein both membranes are reinforced by supple armatures.

Fig. 4 shows on a larger scale the manner in which the membranes and the armature are fastened according to the embodiment of Figs. 1 and 2, while Fig. 5 represents on a larger scale the fastening of the inner membrane and of its armature according to the embodiment of Fig. 3.

The electrodialysis apparatus according to the invention mainly consists of a cylindrical outer electrode 1 and a cylindrical inner electrode 2, and of the membranes 3 and 4, said membranes separating the two electrode compartments 8 and 9 from the dialysate chamber 7 located between said electrode compartments. The electrodes and the membranes are maintained in concentric relationship to each other by a head assembly at each end of the apparatus. The upper head assembly comprises a support 58 for the inner electrode and the inner membrane, a support for the outer electrode and the outer membrane, which, for manufacturing reasons, consists of two halves 22, 23 clamped together by means of bolts 27, and a plate 63, to which the two supports are secured, the first one by means of bolts 21, the second one by means of a central extension passing through a hole in the plate 63 and provided with a screwed-on part 20. The lower head assembly is similarly arranged with the parts 19, 28, 29, 36 and 10, corresponding to parts 58, 22, 23, 63 and 20 of the upper head assembly. In the embodiment shown the supports 19 and 18 are screwed into the inner electrode 2, whereas the ends of the outer electrode 1 fit into recesses provided in the supports 22, 23, and 28, 29. When the screwed-on parts 20 and 10 and the nuts of the bolts 21 are tightened, the parts composing the electrodialysis apparatus are rigidly secured to each other.

Terminals 24 and 25 connect a source of continuous current with the inner and the outer electrodes respectively. To prevent short-circuiting, the end plates 36 and 63 are manufactured from a suitable insulating material. The parts 22, 23 and part 58, supporting the respective upper ends of the outer and the inner electrodes, and the parts 28, 29 and part 19, supporting the respective lower ends of the outer and the inner electrodes, form the collecting chambers 38 and 62. The dialysate is fed at 14 into the collecting chamber 38 and flows from there in a uniform fashion into the annular dialysate chamber 7. From there the dialysate reaches the collecting chamber 62 and leaves the apparatus at 15. At 12 the rinsing liquid for the outer electrode compartment is supplied to the collecting chamber 37 formed by the end pieces 28, 29; from here it flows with a uniform velocity through the annular compartment 8, reaches the collecting chamber 64 and is carried off at 13.

The collecting chambers 38, 62 and 37, 64 are made sufficiently capacious to achieve therein relatively low velocities of flow, which is the more important for a uniform velocity distribution throughout the chambers 7 and 8, as the openings 14, 15, and 12, 13, are not symmetrically arranged with regard to the chambers 8 and 7 respectively.

The rinsing liquid for the inner electrode compartment 9 reaches this compartment from the collecting chamber 65 through evenly spaced openings 17, said chamber being supplied with liquid through the nozzle 10. The eduction takes place through the openings 60, discharging into the collecting chamber 66, and from here through the nozzle 11.

In the embodiment according to Figs. 1, 2 and 4 it is assumed that products harmful to the membranes are formed at the outer electrode only. Therefore the outer membrane 3 is provided with a flexible reinforcing means 5 (shown in dotted line in Fig. 2), whereas the inner membrane 4 is supported by rods 6. For the sake of clearness these rods are shown in full line in the Figures 2 and 4, and in a dotted line in Figure 1.

It is also assumed that the pressure in the dialysate chamber 7 is higher than the pressure in the electrode compartments 8 and 9, as usually will be the case. The rods are made from suitable electrically non-conducting material, and have their ends connected by means of the rings 57 to constitute a cage. Due to the overpressure in the dialysate chamber 7 these rods will bend until they come into contact with the electrode 2. However, this will have no disadvantageous action on the membrane, since, as set out above, harmful products are formed at the outer electrode only. It is also possible to arrange the rods 6 against the inner electrode so that they are permanently supported by it.

The fastening of the membranes and of the flexible reinforcing means in the embodiment according to Figures 1 and 2, is further shown in Figure 4, representing on a larger scale the part of Figure 1 marked with a circle.

To spare the membranes and also to achieve tight joints (for there must be no communication between the compartments), the walls to which the membranes and the flexible reinforcing means are fastened are provided with elastic linings 18, 26, consisting of e. g. rubber. The inner membrane 4 is fastened upon the elastic part 18 by means of a thread 32, whereas the outer membrane 3 together with its flexible reinforcing means 5 is first clamped against the elastic part 26 by means of one or more spring rings 30, whereupon the end of the membrane, protruding beyond the extremity of the flexible reinforcing means, is fastened by spring rings 31. A perfectly tight joint is achieved by this last step. The ring or rings 30 alone, pressing down the reinforcing means as well as the membrane, cannot guarantee this, as there could always be some leakage along the reinforcing means between the membrane and the elastic lining 26. This is, however, completely obviated by the rings 31, pressing the membrane along its entire circumference against the lining 26.

Figure 3 represents a cross-section of an electrodialysis apparatus according to the invention, which is broadly similar with that of Figures 1 and 2, but in which the inner membrane 4 is no longer supported by rods located between said membrane and the inner electrode, but by a flexible reinforcing means 33 around said membrane. To keep the membrane inflated it is necessary that the pressure in the inner electrode compartment 9 be higher than the pressure in the dialysate chamber 7, which in its turn is higher than the pressure in the outer electrode compartment 8. The fastening of the membrane 4 and its reinforcing means 33 is shown on an enlarged scale in Figure 5. The membrane 4 and the reinforcing means 33 are fastened around the elastic linings 18 and 59 of the head assemblies 19 and 58 respectively, as by means of a thread 34. Thereupon the end of the membrane which is longer than the reinforcing means is fastened with the thread 35 around the elastic part 18, completing thereby a perfectly tight joint. In many cases this second fastening 35 may be omitted and the fastening 34 will be sufficient, as the inner membrane is in direct contact with part 18, in contradistinction to membrane 3. The fastening 35 gives however an extra safeguard, as, due to the presence of the reinforcing means 33 between the thread 34 and the membrane 4, it is not under all circumstances possible to press the membrane over its entire circumference uniformly against the elastic part 18.

Although in the embodiments shown in the drawing the outer membrane, or the outer and the inner membranes, are provided with a supple reinforcing means, this reinforcing means naturally may be dispensed with if the membranes as such are strong enough to resist the occurring pressures without excessive tensions and deformations. The advantage is twofold. First, the construction is simplified. Second, the absence of reinforcing means offers the advantage that the liquid flow circulating through the respective compartments is not hampered.

It will be readily understood that the liquid filling up the interstices between the threads of the reinforcing means will have (especially if the threads are arranged close to each other) much lower a velocity than in those sections through which the liquid can flow without impediment. This slowing down is of course preferably to be avoided.

Various other embodiments are possible without departing from the scope of the invention.

I claim:

1. In an apparatus for the continuous electrodialysis of liquids, having two electrode chambers separated by a dialysate chamber, a cylindrical outer electrode, a cylindrical inner electrode, two thin flexible membranes of cylindrical form spaced from each other and disposed between said electrodes in spaced relation thereto, a head assembly at one end of said cylindrical electrodes and membranes and a head assembly at the other end thereof, said head assemblies supporting respective end portions of said cylindrical electrodes and membranes in concentric and closely spaced relation, one within another, so that said electrodes and said flexible membranes define separate narrow annular electrode and dialysate chambers therebetween, said head assemblies closing the opposite ends of each of said chambers and providing separate liquid inflow means and liquid offtake means communicating respectively with such opposite ends for the continuous circulation of a separate liquid through each of said narrow annular chambers.

2. In an apparatus for the continuous electrodialysis of liquids, having two electrode chambers separated by a dialysate chamber, a cylindrical outer electrode, a cylindrical inner electrode, two thin flexible membranes of cylindrical form spaced from each other and disposed between said electrodes in spaced relation thereto, a head assembly at one end of said cylindrical electrodes and membranes and a head assembly at the other end thereof, said head assemblies supporting respective end portions of said cylindrical electrodes and membranes in concentric and closely spaced relation, one within another, so that said electrodes and said flexible membranes define separate narrow annular electrode and dialysate chambers therebetween, said head assemblies closing the opposite ends of each of said chambers and providing separate liquid inflow means and liquid offtake means communicating respectively with such opposite ends for the continuous circulation of a separate liquid through each of said narrow annular chambers, the annular chamber between said outer electrode and the outer of said membranes being substantially free from internal obstructions.

3. In an apparatus for the continuous electrodialysis of liquids, having two electrode chambers separated by a dialysate chamber, a cylindrical outer electrode, a cylindrical inner electrode, two thin flexible membranes of cylindrical form spaced from each other and disposed between said electrodes in spaced relation thereto, a head assembly at one end of said cylindrical electrodes and membranes and a head assembly at the other end thereof, said head assemblies supporting respective end portions of said cylindrical electrodes and membranes in concentric and closely spaced relation, one within another, so that said electrodes and said flexible membranes define separate narrow annular electrode and dialysate chambers therebetween, said head assemblies closing the opposite ends of each of said chambers and providing separate liquid inflow means and liquid offtake means communicating respectively with such opposite ends for the continuous circulation of a separate liquid through each of said narrow annular chambers, said head assemblies comprising similarly formed head members at opposite ends of said inner electrode which support such ends and the opposite ends of the inner of said membranes and other similarly formed head members at opposite ends of said outer electrode which support said ends and the opposite ends of the outer of said membranes.

4. An apparatus as described in claim 3, the cylindrical ends of said membranes being secured to the respective head members by flexible clamping means, said members having resilient linings beneath said ends to which said ends are held tightly by said clamping means.

5. An apparatus as described in claim 4, said clamping means comprising annular springs pressing the ends of the outer of said membranes outwardly against the respective resilient linings.

6. An apparatus as described in claim 4, said clamping means comprising threads wound tightly around the cylindrical ends of the inner of said membranes.

7. An apparatus as described in claim 1, the width of the annular space between each of said electrodes and the adjacent membrane being not more than about 10 mm.

8. An apparatus as described in claim 1, the width of the annular space between each of said electrodes and the adjacent membrane being less than 5 mm.

9. In an apparatus for the continuous electrodialysis of liquids, having two electrode chambers separated by a dialysate chamber, a cylindrical outer electrode, a cylindrical inner electrode, two thin flexible membranes of cylindrical form spaced from each other and disposed between said electrodes in spaced relation thereto, head pieces at the opposite ends of said cylindrical electrodes and membranes and supporting said ends in concentric and closely spaced relation, one within another, so that said electrodes and said flexible membranes define separate narrow annular electrode and dialysate chambers therebetween, said head pieces closing the opposite ends of each of said chambers and providing separate liquid inflow means and liquid offtake means communicating respectively with such opposite ends for the continuous circulation of a separate liquid through each chamber, and thin flexible reinforcing means extending circumferentially about and distributed substantially evenly over the area of the outer surface of at least one of said membranes to limit the deflection of such membrane by a differential pressure of liquids flowing through said annular chambers.

10. An apparatus as described in claim 9, said flexible reinforcing means comprising a tubular fabric of thin strands confining said membrane.

11. An apparatus as described in claim 1, each of said annular chambers being substantially free from internal obstructions so that the flow of liquid therethrough can be maintained readily at a substantially uniform composition, and said apparatus including means for forcing separate liquid streams through the respective annular chambers under differential pressures subjecting each of said flexible membranes to an outwardly directed differential pressure head.

12. An apparatus as described in claim 11, each of said membranes having flexible reinforcing means extending circumferentially around and distributed substantially evenly over the area of its outer surface.

13. In an apparatus for the continuous electrodialysis of liquids, having two electrode chambers separated by a dialysate chamber, a cylindrical outer electrode, a cylindrical inner electrode, two thin flexible membranes of cylindrical form spaced from each other and disposed between said electrodes in spaced relation thereto, a head assembly at one end of said cylindrical electrodes and membranes and a head assembly at the other end thereof, said head assemblies supporting respective end portions of said cylindrical electrodes and membranes in concentric and closely spaced relation, one within another, so that said electrodes and said flexible membranes define separate narrow annular electrode and dialysate chambers therebetween, said head assemblies enclosing the ends of said chambers, each of said head assemblies providing a plurality of separate liquid collecting chambers and separate liquid ducts connected with the respective collecting chambers, each of said collecting chambers communicating with one end of one of said narrow annular chambers, whereby separate liquids may be continuously circulated under pressure through the respective annular chambers.

References Cited in the file of this patent

UNITED STATES PATENTS

| 1,297,395 | Oiwa | Mar. 18, 1919 |
| 1,476,251 | Handy | Dec. 4, 1923 |
| 2,093,770 | Billiter | Sept. 21, 1937 |